(12) United States Patent
Francescon et al.

(10) Patent No.: US 8,644,131 B2
(45) Date of Patent: Feb. 4, 2014

(54) NETWORK ARCHITECTURE FOR DATA COMMUNICATION

(75) Inventors: Antonio Francescon, Mattarello (IT); Davide Mandato, Villazzano (IT)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 177 days.

(21) Appl. No.: 12/158,412

(22) PCT Filed: Dec. 20, 2006

(86) PCT No.: PCT/EP2006/012291
§ 371 (c)(1), (2), (4) Date: Jun. 20, 2008

(87) PCT Pub. No.: WO2007/071386
PCT Pub. Date: Jun. 28, 2007

(65) Prior Publication Data
US 2009/0003193 A1    Jan. 1, 2009

(30) Foreign Application Priority Data
Dec. 22, 2005   (EP) .................................... 05028181

(51) Int. Cl.
*G01R 31/08*  (2006.01)
*H04L 12/26*  (2006.01)

(52) U.S. Cl.
USPC .......................................... 370/216; 370/241

(58) Field of Classification Search
USPC ................. 370/228, 238, 338, 401, 216, 241; 455/428
See application file for complete search history.

(56) References Cited

U.S. PATENT DOCUMENTS 6,130,892 A * 10/2000 Short et al. .................... 370/401
7,590,055 B2 * 9/2009 Segel ............................ 370/228
(Continued)

FOREIGN PATENT DOCUMENTS

WO   WO2004/073257   8/2004

OTHER PUBLICATIONS

Shah, R. C. et al: "Data Mules: Modeling a Three-Tier Architecture for Sparse SensorNetworks"ICC 2003. 2003 IEEE InternationalConference on Communications. Anchorage,AL, May 11-15, 2003, IEEE International Conference on Communications, NewYork, NY: IEEE,US, vol. 5 of 5, 2003, pp. 30-41, XP010642615 ISBN: 0-7803-7802-4.

(Continued)

*Primary Examiner* — Mark Rinehart
*Assistant Examiner* — Gbemileke Onamuti
(74) *Attorney, Agent, or Firm* — Conley Rose, P.C.; J. Robert Brown, Jr.

(57) ABSTRACT

This invention relates to a network architecture for data communication between data sources and data destinations via network nodes and at least one data concentrator. According to the invention the nodes (2, 4) are conceived to communicate with a data concentrator (1) in both directions either via a permanently operative network (8) in the multihop mode or via an occasionally operative network (5) in wireless connection with mobile user nodes (6) in the nomadic mode. Means for commutation are provided to detect faulty multihop nodes and to activate nomadic nodes instead until the fault disappears, in order to maintain the overall functionality of the network. Moreover the network according to the invention allows to share the data collected by mobile users with other mobile users, thus forming a peer-to-peer network.

15 Claims, 2 Drawing Sheets

(56) References Cited

U.S. PATENT DOCUMENTS

| | | | | |
|---|---|---|---|---|
| 7,646,752 | B1* | 1/2010 | Periyalwar et al. | 370/338 |
| 2004/0146007 | A1* | 7/2004 | Saadawi et al. | 370/238 |
| 2005/0010029 | A1 | 1/2005 | Brown | |
| 2007/0072604 | A1* | 3/2007 | Wang | 455/428 |

OTHER PUBLICATIONS

Carreras et al.;"Nomadic sensor networks"Wireless Sensor Networks, 2005.Proceeedings of the Second European Workshop on Istanbul, Turkey Jan. 31-Feb. 2, 2005, Piscataway, NJ, USA,IEEE, US, Jan. 31, 2005, pp. 166-175, XP010815587 ISBN: 0-7803-8801-1.

Zhao et al.;"Routing Protocols for Self-Organizing Hierarchical Ad-Hoc Wireless Networks"IEEE 2003 Sarnoff Symposium,[Online] Mar. 2003, pp. 1-4, XP002380996.

Unofficial International Report on Patentability dated Jun. 24, 2008 for corresponding PCT application PCT/EP06/12291.

* cited by examiner

NETWORK ARCHITECTURE FOR DATA COMMUNICATION

PRIORITY INFORMATION

The present application is a national stage of International Patent Application Number PCT/EP2006/012291, filed on Dec. 20, 2006, which claims priority from European Patent Application Number 05028181.5 filed with the European Patent Office on Dec. 22, 2005. The entire content of PCT Patent Application Number PCT/EP2006/012291, filed on Dec. 20, 2006, is hereby incorporated by reference.

The present invention refers to data communication networks adapted to interconnect multiple data sources and data receivers.

The opportunistic exploitation of mobile users moving in a certain area and being equipped with wireless digital devices of high performance in terms of computing and memory, and able to collect, to process and to share environmental data collected via a large amount of low-cost sensors located in outdoor environments is currently of high interest in the research field of Situated Autonomic Communications. It has been recognized that such nomadic approach has the potentiality to pave the way to the induction of large-scale deployment of location/context aware applications and services for the benefit of both private and public users. Furthermore such communication paradigm solves the well known scalability and cost problem inherent with multi-hop routing-based architectures.

The European patent applications EP 05001930.6 and EP 05008909.3 of the present applicant aim at a novel approach able to address these challenges. Nature and society exhibit many instances of systems in which large populations are able to reach efficient equilibria and to develop effective collaboration and survival strategies, able to work in the absence of central control and to exploit local interactions. The present invention intends to provide a fully integrated network and service environment that scales to large amounts of heterogeneous devices, and that is able to adapt and evolve in an autonomic way.

The subjects of the European patents cited above overcome device heterogeneity and achieve scalability via an autonomic and localized peer-to-peer communication paradigm. They evolve to adapt to the surrounding environment, just like living organisms evolve by natural selection. Network operations are driven by the services, providing an ad hoc support when and where needed to fulfil user requests. Security issues are considered as a fundamental part of the services themselves, representing a key ingredient for achieving a purposeful autonomic system. The network becomes just an appendix of the services which, in turn, become a mirror image of the social networks of users they serve. This people-centric paradigm breaks the barrier between service providers and users, and sets up the opportunity for "mushrooming" of spontaneous services, therefore paving the way to a service and user-centric Information and Community Technology revolution.

The present invention intends to resolve the problems due to the emerging trend towards pervasive computing and communication environments, i.e. the large number of networked embedded devices. Such device possesses sensing/identifying capabilities, making it possible for user-situated services to interface directly with the surrounding environment, entailing the possibility of introducing radically novel service, able to enhance the five senses, and the communication and tool manipulation capabilities of human beings.

The embedded devices must possess computing and (basic) communication capabilities, having the potential to form a massively larger networked system, orders of magnitude larger than the current internet.

The complexity of such environments will not be far from that of biological organisms, ecosystems and socio-economic communities.

Traditional communication approaches are ineffective in the context, since they fail to address several new features: a wide heterogeneity in node capabilities and service requirements, a huge number of nodes with consequent scalability issues, the possibly high node mobility and the management complexity.

The network architecture according to the present invention resolves the problems cited above and provides a structure which is based on a trade-off between the known state of the art concerning multihop routing and the content of the earlier EP applications cited above of the present applicant, called here-after nomadic approach.

According to the invention the network architecture for data communication between data sources and data destinations via network nodes and at least one data concentrator is characterized in that the nodes are conceived to communicate with a data concentrator in both directions either via a permanently operative network in the multihop mode or via an occasionally operative network in wireless connection with mobile user nodes in the nomadic mode, and that means for commutation are provided to detect faulty multihop nodes and to activate nomadic nodes instead until the fault disappears, in order to maintain the overall functionality of the network.

For details and variants of the networks according to the invention reference is made to the dependent claims.

The invention will be described here-after with reference to the attached drawings.

Figure 1:
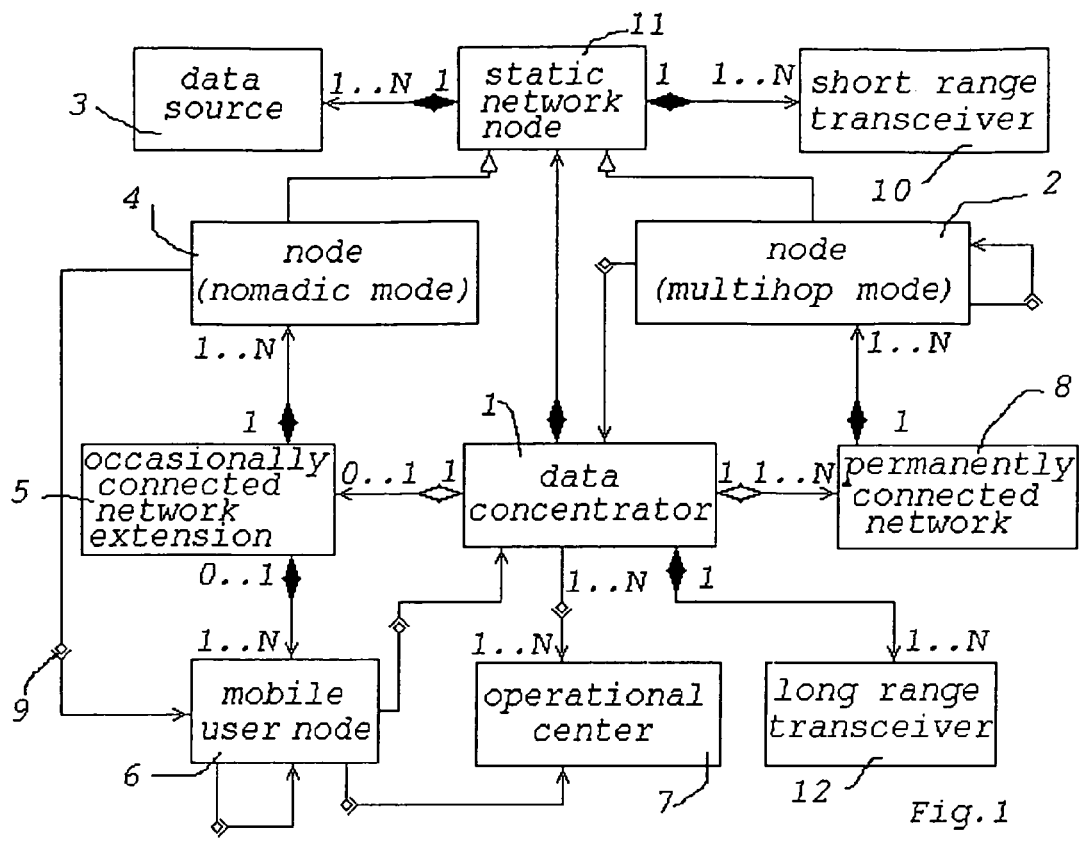
FIG. 1 shows schematically a network according to the invention.

Referring now to FIG. 1, the network is organized around a data concentrator 1 as a wireless, permanently connected cluster of transceiver devices and nodes 2 in the multihop mode, associated with a data source 3 (or a multiplicity thereof), wherein the information moves among said nodes towards the data concentrator 1 by following the multihop approach. In addition to such clusters, a certain number of nodes 4 are available, which are not connected to said clusters. Such nodes operate independently from each other and provide their information via occasionally connected network extensions 5 to passing-by mobile users 6 on a polling basis. Devices of mobile users 6 carry said data, after having picked them up, until the users approach a data concentrator 1. It is further possible that the users might share the collected data among themselves (whenever they encounter mobile users along the travel) via peer-to-peer communications.

All data collected by any data concentrator (only one concentrator 1 being shown) will be forwarded, raw as they were collected or modified, after some preliminary elaborations, to an operational center 7 where the collected data are analyzed.

Depending on the kind of situation it will be perceived at the operational center and adequate case-specific procedures will be eventually activated.

The network according to the invention is based on two distinct networks merged in an integrated architecture: In the multihop mode, nodes 2 find a wireless path through other nodes (not shown in FIG. 1) via a permanently operational network 8 to a data concentrator 1. Techniques such as data aggregation or particular architectures could be used to optimize the number of messages sent (thus reducing the power consumption of the nodes). The activity of the network 8 is managed by the data concentrator, scheduling the tasks of nodes (basically collect data from environment).

In the nomadic mode data are collected by a node 4 independently without communicating with other nodes. When a mobile user 6 is sufficiently close to the node, the latter sends via the occasionally connected network extension 5 to the user 6 all the data collected. The mobile user 6 then moves in an area where there could be other mobile users: If it crosses one of them, it shares "on the fly" all the collected data. Every time a mobile user 6 reaches a data concentrator, it forwards to it all the data it has collected during its travel.

The network architecture according to the invention is composed of four different kinds of devices as shown in FIG. 1. Their respective links are represented according to the UML standard as follows:

Lines terminating with a arrow-like triangle (see static network node 11) signify an inheritance relationship or hierarchical dependency between nodes.

Lines terminating with a white lozenge mean an aggregation relationship. The two objects linked by this lozenge are logically grouped together.

Lines terminating with a black lozenge mean a composition relationship: Each instance of the object close to this lozenge is composed by a certain number of instances of pointing object.

The symbol comprising a square rectangle (such as between the nodes 4 and 6) signifies a physical interface (one of them bearing the reference numeral 9). The objects linked in this manner can communicate unidirectionally, the communication direction being defined by the arrow at the end of the line.

The notations "1", " . . . N" and "0 . . . 1" along certain link lines define the number of instances with which an object cooperates, namely with exactly one, at least one or at most one instance.

The essential elements of the network according to the invention will now be described:

Nodes 2 and 4 comprise each at least a transceiver, adequate computer capability, a memory and at least one component acting as data source. They operate either in the multihop or the nomadic mode. Both are derived from the conceptual static network node, which is intended to cooperate with at least one data source 3 and one or more short range transceivers.

Mobile user nodes 6 are mounted on mobile units which move across the area where the architecture is deployed. It can collect data from nodes, share them with other mobile users and then forward them to the first data concentrator met during its movement.

A data concentrator 1 is able to communicate via interfaces (black double arrows in FIG. 1) with all the other kinds of devices forming the net. It organizes the communication with them and participates therewith as an active element.

An operational center 7 is the final destination of all informations collected by mobile users. It sends its queries to the data concentrator 1 and can handle the large amount of data that it receives as answer from them.

Finally short and long range transceivers 10 and 12 are foreseen for transmitting data within the network.

The partial replacement of the classical network infrastructure with the mobility of mobile users which collect and share data, offers the solution to the technological challenge of ensuring connectivity.

The nomadic mode is the default mode for every node, but if a message originally sent from a data concentrator 1 arrives at a node in the nomadic mode (directly or indirectly), the node commutes to the multihop mode, self-organizing to join the cluster of that data concentrator and involving other eventual nodes adjacent to it and not yet commutated.

If a malfunction in the net makes the data concentrator 1 no more reachable by a certain node in multi-hop mode, this node commutes to the nomadic mode. So if an adequate number of mobile users 6 grants the coverage of all nodes, data collection proceeds possibly slower but successfully in every active node, and the loss of data is limited to the fallen or malfunctioning nodes.

Figure 2:
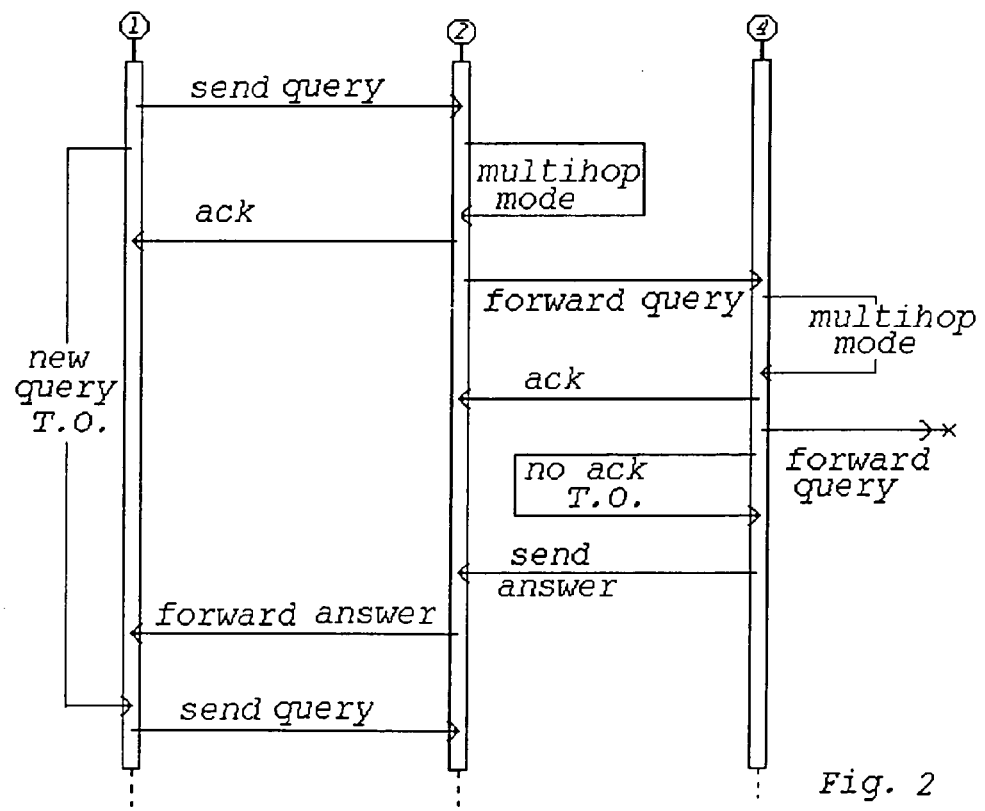
FIG. 2 shows schematically the intercommunication between a data concentrator 1 and two nodes 4 initially in the nomadic mode.

FIG. 2 shows the data flow between a data concentrator 1 and two nodes 2 and 4. After an initialisation phase (not shown) both nodes are in the nomadic mode. Periodically the data concentrator 1 sends a query message. A node receiving such a message which is in the nomadic mode, commutes to the multihop mode and then forwards the received message.

If a node receives no acknowledgement within a given delay ("time out" T.O.) for the forwarded query (see node 4), it sends an answer message to the node from which the query message came. If a node receives an answer message, it integrates this message into its collected data and sends it to the node (or to the data concentrator as the case may be) that had sent the query message.

Figure 3:
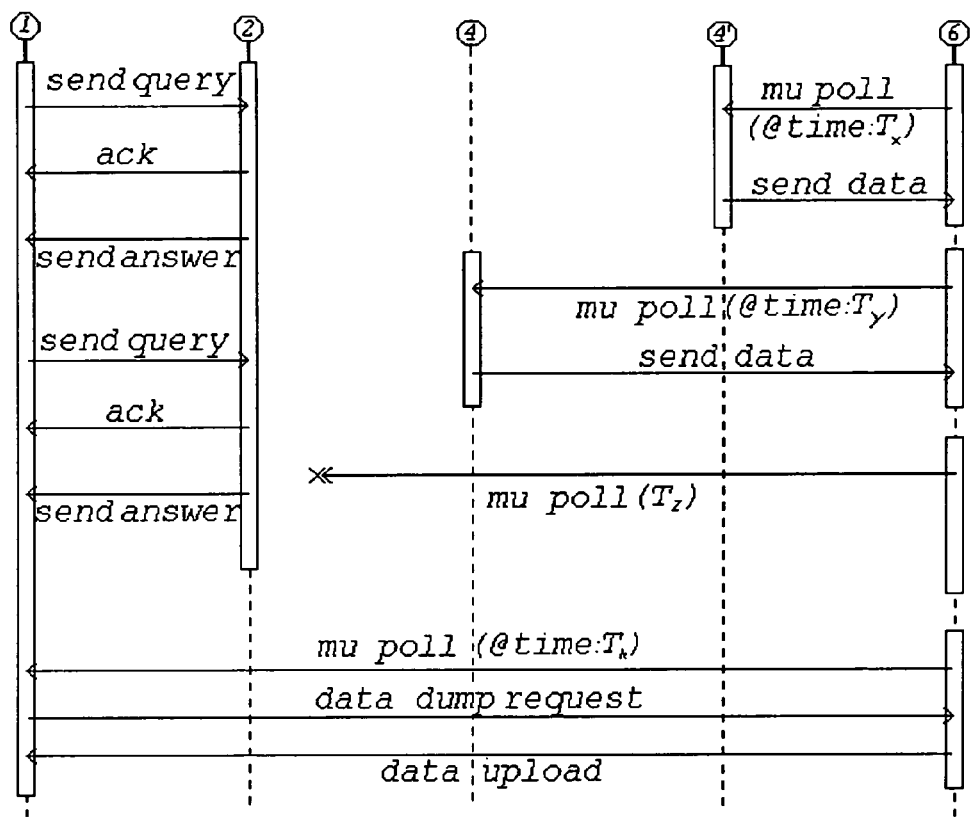
FIG. 3 shows schematically the intercommunication between a data concentrator 1 and nodes in nomadic or multi-hop mode for serving a mobile user 6.

FIG. 3 shows the data flow between the data concentrator 1, a node 2 in the multihop mode, two nodes 4, and 4' in the nomadic mode and a mobile user 6. Periodically every user sends a poll message. If a node in the nomadic mode receives it, this node transmits to the user the data which it had collected. In this example it happens at the instant $T_x$ between the user and the node 41 and at the instant $T_y$ between the user and the node 4.

If a poll message sent by the user is received by a node 2 in the multihop mode, it will be ignored by this node. This happens here at the instant $T_x$.

Finally if the poll message emitted by a user is received by a data concentrator, the latter replies with a data dump request message thus signalling to the user the presence of the data concentrator. Consequently the user sends to the data concentrator all the collected information which it had gathered since it met the previous data concentrator.

Figure 4:
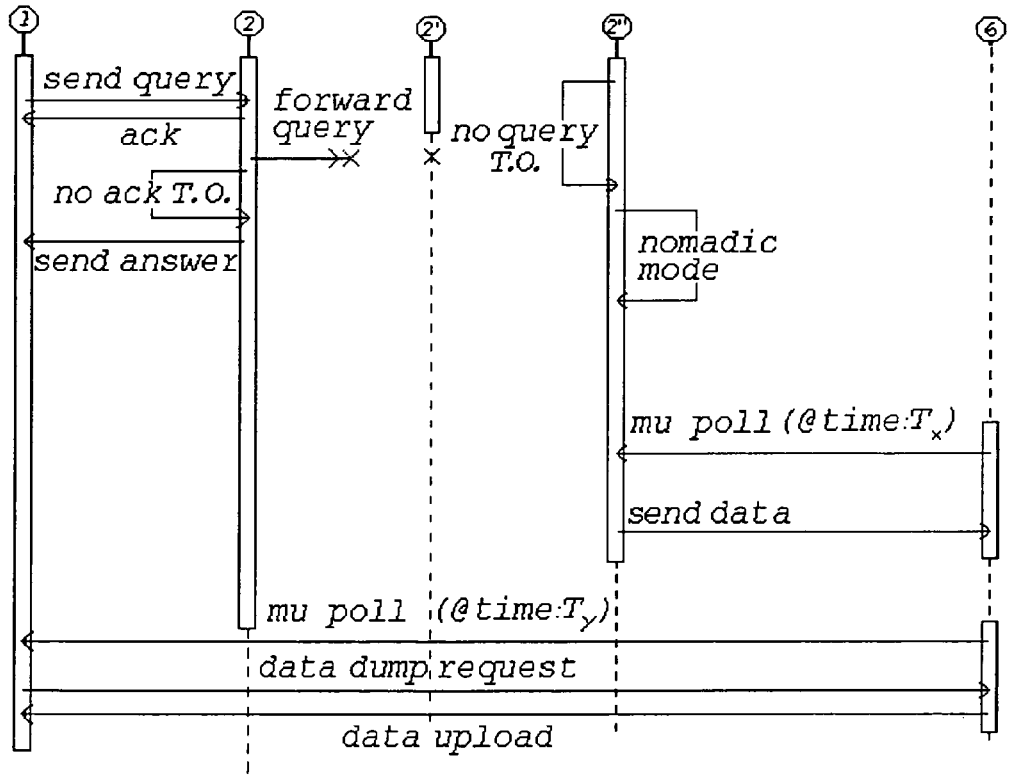
FIG. 4 shows schematically the intercommunication between a data concentrator 1 and multihop nodes in case of a malfunctioning node.

FIG. 4 applies to the data transfer in case of a malfunctioning node 2' in the multihop mode: Due to the malfunctioning node 2' the communication between node 2" (in the multihop mode) and its related data concentrator is broken. Consequently, since the node 2" has not received any query message within a given space of time (T.O.), the node 2" itself commutes to the nomadic mode and waits for a user 6 in order that the latter collects its information at the instant $T_x$ and delivers it at the instant $T_y$ to a data concentrator (not necessarily the one to which the node is associated, but the one which the user approaches first.

A node that has been commuted to the nomadic mode after having lost the connection to a data concentrator may commute again to the multihop mode when a query message arrives there as described on the basis of FIG. 3.

A single mobile user 6 collects data from low cost sensors, transports those data during his movement and exchanges/ shares them with the community of mobile users populating that area. Mobile users may collect data from the concentrator 1 integrating their knowledge of the surrounding environment with the one collected by the multihop subnets. As compensation for its help in collecting, transporting and sharing information a mobile user receives continuously updated informations related to a wider geographical service coverage than the one it can obtain just acting alone. At the same time, local administrations or third parties may take advantages from the existence of this service, in order to improve the existing public/private services or to offer to the citizens a new kind of services.

A further advantage of the network according to the invention over the state of the art resides in the fact that it helps to obviate to the problem of partitions of the permanently connected net (consequence of malfunctioning nodes), taking advantage of the ability of the mobile users to diffuse data.

The invention claimed is:

1. A network for data communication, the network comprising:
   network nodes to provide communication between sources and destinations;
   a data concentrator; and
   said network nodes being configured to communicate with said data concentrator in both directions either via a permanently operative network in a multihop mode or via an occasionally operative network in wireless connection with mobile user nodes in a nomadic mode;
   at least some of said network nodes configured to convert to nomadic nodes, in response to detecting faulty multihop nodes, until a detected fault or faults disappears, to maintain overall functionality of the network.

2. The network according to claim 1, wherein the detecting of the faulty multihop nodes is based upon query signals periodically transmitted through the permanently operative network.

3. The network according to claim 2, wherein a conversion of a node from a multihop mode to a nomadic mode is effected when the periodical query signals are not detected.

4. The network according to claim 3, wherein mobile user nodes are configured to store data received from the node in the nomadic mode and to forward the received data to another data concentrator in communication range.

5. The network according to claim 3, wherein the mobile user nodes are configured to share the collected data with other user nodes in communication range, thus forming a peer-to-peer network.

6. The network according to claim 2, wherein mobile user nodes are configured to store data received from a node in a nomadic mode and to forward the received data to another data concentrator in communication range.

7. The network according to claim 2, wherein the mobile user nodes are configured to share the collected data with other user nodes in communication range, thus forming a peer-to-peer network.

8. The network according to claim 1, wherein the mobile user nodes are configured to store data received from a node in a nomadic mode and to forward the received data to another data concentrator in communication range.

9. The network according to claim 8, wherein the mobile user nodes are configured to share the collected data with other user nodes in communication range, thus forming a peer-to-peer network.

10. The network according to claim 1, wherein the mobile user nodes are configured to share the collected data with other user nodes in communication range, thus forming a peer-to-peer network.

11. A method carried out by a network node of a plurality of network nodes that provide communication between sources and destinations in a network, the method comprising:
    communicating with a data concentrator in both directions either via a permanently operative network in a multihop mode or via an occasionally operative network in wireless connection with mobile user nodes in a nomadic mode; and converting to a nomadic node, in response to detecting a faulty multihop node, until a detected fault disappears, to maintain overall functionality of the network.

12. The method according to claim 11, wherein the detecting of the faulty multihop nodes is based upon query signals periodically transmitted through the permanently operative network.

13. The method according to claim 12, wherein the converting of the network node from a multihop mode to a nomadic mode is effected when the periodical query signals are not detected.

14. The method according to claim 12, further comprising detecting the faulty multihop node before the conversion to the nomadic node.

15. The method according to claim 11, further comprising detecting the faulty multihop node before the conversion to the nomadic node.

* * * * *